(12) United States Patent
King et al.

(10) Patent No.: US 9,508,266 B2
(45) Date of Patent: Nov. 29, 2016

(54) CROSS-CLASSROOM AND CROSS-INSTITUTION ITEM VALIDATION

(71) Applicant: PRESIDENT AND FELLOWS OF HARVARD COLLEGE, Cambridge, MA (US)

(72) Inventors: Gary King, Brookline, MA (US); Brian Lukoff, Boston, MA (US); Eric Mazur, Concord, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 659 days.

(21) Appl. No.: 13/871,455

(22) Filed: Apr. 26, 2013

(65) Prior Publication Data

US 2013/0302774 A1    Nov. 14, 2013

Related U.S. Application Data

(60) Provisional application No. 61/639,266, filed on Apr. 27, 2012.

(51) Int. Cl.
| | | |
|---|---|---|
| *G09B 5/00* | (2006.01) | |
| *G09B 7/00* | (2006.01) | |
| *G09B 5/02* | (2006.01) | |
| *G09B 5/04* | (2006.01) | |
| *G09B 7/02* | (2006.01) | |

(52) U.S. Cl.
CPC . *G09B 7/00* (2013.01); *G09B 5/00* (2013.01); *G09B 5/02* (2013.01); *G09B 5/04* (2013.01); *G09B 7/02* (2013.01)

(58) Field of Classification Search
CPC ............. G09B 5/00; G09B 7/00; G09B 7/02
USPC .................... 434/322, 323, 350, 362
See application file for complete search history.

(56) References Cited

U.S. PATENT DOCUMENTS

| | | | | | |
|---|---|---|---|---|---|
| 5,565,316 | A | * | 10/1996 | Kershaw | G09B 7/02 434/118 |
| 5,827,070 | A | * | 10/1998 | Kershaw | G09B 7/02 434/118 |
| 6,431,875 | B1 | * | 8/2002 | Elliott | G09B 7/00 434/118 |
| 6,491,525 | B1 | * | 12/2002 | Hersh | G09B 5/065 434/236 |
| 6,622,003 | B1 | * | 9/2003 | Denious | G09B 5/08 434/307 R |
| 8,731,455 | B2 | * | 5/2014 | Colby | G09B 7/02 434/350 |
| 8,798,518 | B2 | * | 8/2014 | Almond | G09B 7/02 434/350 |
| 8,915,744 | B2 | * | 12/2014 | Srinivasan | G09B 7/00 434/322 |

(Continued)

FOREIGN PATENT DOCUMENTS

| | | |
|---|---|---|
| CN | 104620299 A | 5/2015 |
| WO | 2013/163521 A1 | 10/2013 |

OTHER PUBLICATIONS

Longford, N. Multilevel analysis with messy data. Statistical Methods in Medical Research, Dec. 2001, vol. 10 Issue 6, p. 429-444, 16p. Publisher: Sage Publications, Ltd.*

(Continued)

*Primary Examiner* — Nikolai A Gishnock
(74) *Attorney, Agent, or Firm* — Kilpatrick Townsend & Stockton LLP

(57) ABSTRACT

Anonymous pretesting items for subsequent presentation to participants in a group enable an instructor to validate responses and revise the items accordingly.

20 Claims, 4 Drawing Sheets

(56) References Cited

U.S. PATENT DOCUMENTS

| | | | |
|---|---|---|---|
| 2004/0219493 A1* | 11/2004 | Phillips | G09B 5/06 434/118 |
| 2004/0219504 A1* | 11/2004 | Hattie | G09B 7/00 434/353 |
| 2006/0155513 A1 | 7/2006 | Mizrahi et al. | |
| 2007/0269788 A1* | 11/2007 | Flowers | G09B 7/00 434/350 |
| 2008/0090221 A1 | 4/2008 | Ashby | |
| 2008/0187898 A1* | 8/2008 | Hattie | G09B 7/00 434/350 |
| 2009/0035733 A1* | 2/2009 | Meitar | G09B 7/00 434/118 |
| 2010/0255455 A1 | 10/2010 | Velozo et al. | |
| 2011/0039244 A1 | 2/2011 | Packard et al. | |
| 2011/0065082 A1 | 3/2011 | Gal et al. | |
| 2011/0223576 A1* | 9/2011 | Foster | G09B 7/02 434/362 |
| 2012/0214147 A1* | 8/2012 | Ernst | G09B 7/00 434/353 |
| 2015/0236866 A1* | 8/2015 | Colby | H04L 12/1822 709/205 |

OTHER PUBLICATIONS

Blackwell et al, "CEM:. Coarsened exact matching in Stata," The Stata Journal 9, No. 4, 2-5 and 15-18, pp. 524-546. 2009. [Retrieved from the internet: http://gking.harvard.edu/files/gking/files/cemStata_0.pdf].

Tew et al, "Developing a Validated Assessment of Fundamental CS1 Concepts," SIGCSE'10, Mar. 10-13, 2010, Milwaukee, Wisconsin. ACM 978-1-60558-885-8/10/03, pp. 97-101,[Retrieved from the internet: http://teaching.software-carpentry.org/wp-content/uploads/2014/02/p97.pdf].

International Search Report mailed Aug. 16, 2013, for Patent Application PCT/US2013/038375, 3 page.

Written Opinion completed Jul. 31, 2013 for International Patent Application PCT/US2013/038375 filed Apr. 26, 2013, 7 pages.

International Preliminary Report on Patentability issued Oct. 28, 2014 for International Patent Application PCT/US2013/038375 filed Apr. 26, 2013, 10 pages.

* cited by examiner

CROSS-CLASSROOM AND CROSS-INSTITUTION ITEM VALIDATION

CROSS-REFERENCE TO RELATED APPLICATION

This application claims priority to and the benefit of, and incorporates herein by reference in its entirety, U.S. Provisional Patent Application No. 61/639,266, which was filed on Apr. 27, 2012.

GOVERNMENT RIGHTS

This invention was made with Government support under National Science Foundation award IIS-0835338. The Government has certain rights in the invention.

FIELD OF THE INVENTION

In various embodiments, the present invention relates generally to peer instruction and peer learning and, in particular, to pretesting items for enhancing cross-classroom and cross-institution item validation.

BACKGROUND

Instructors may present pedagogical "items"—e.g., questions posed to participants in, for example, a classroom environment—to teach or otherwise instruct students. It is challenging, however, to develop effective items, and the challenge extends beyond thinking of good questions to ask. The larger problem is that it is difficult to know ex ante how an item will function among the participants that respond to it—e.g., how difficult an item will be, how distracting the "distractors" (incorrect response options) in a multiple-choice item will be, etc. The most useful in-class questions in peer instruction and peer learning are those which discriminate among the students in their degree of knowledge, and which reveal their misunderstandings. For peer instruction, ideally only about half of the students will have the right answer initially, and probably fewer will understand why it is the right answer.

For these reasons, the items that make up large-scale, high-stakes standardized tests are extensively pretested so that poorly functioning items (e.g., those with too high or low a percentage of correct answers) can be revised or discarded. However, instructors are confronted with inadequacy of their data sets and they rarely (if ever) have the resources to do this type of pretesting for their own items. In particular, instructors cannot influence the result of the items, which leads to biased results. An additional problem is that pretesting among students in one's own class typically makes it impossible to keep the class discussion fresh and to obtain accurate measurements of student learning, yet testing in other classes is not feasible for most instructors. It is desirable to replicate randomized participant data sets as closely as possible by obtaining treated and control group of participants with similar covariate distributions and characteristics.

Consequently, there is a need for an approach that can provide easy and fast guidance to instructors on how to best validate the items and obtain useful results in class.

SUMMARY

The present invention facilitates anonymous pretesting of items in classrooms (and/or other similar settings) to which the item author has no direct access or knowledge. In some embodiments, pretesting is performed by software used by the instructor/author in his or her own classroom for other tasks. In various implementations, the software shares information with a central clearinghouse anonymously. The central clearinghouse then automatically matches students in the instructor's class with "relevant" students from other classes—e.g., students that a statistical algorithm predicts will have approximately the same understanding, and will give approximately the same answers, as the instructor's class.

To accomplish this matching, embodiments of the invention first identify matching variables. These variables may involve characteristics of the target students, characteristics of the target class, and characteristics of the institution where the items will be presented. Since the collection of students in any two classrooms usually differs in important ways, trying to match one actual class with another would usually be fruitless. To solve this problem, a "composite class" may be created by selecting students from a large number of other classes, possibly at other institutions, to pretest items. This composite class is used to pre-test questions.

As used herein, the term "item" refers to a question that an instructor poses to participants during an event and that participants respond to by using, for example, handheld devices. Items may or may not have a correct answer and may have any response format (i.e., they need not be multiple-choice). Items may attempt to assess factual information, tease out conceptual difficulties, or measure participants' opinions. The term "handheld device" as used herein broadly connotes any device or system facilitating wired and/or wireless bi-directional communications, and may include computers, smart phones, or other personal communication devices. Smart phones include mobile phones or tablets capable of executing locally stored applications and supporting wireless communication and data transfer via the Internet or the public telecommunications infrastructure. Smart phones include, for example, IPHONES (available from Apple Inc., Cupertino, Calif.), BLACKBERRIES (available from RIM, Waterloo, Ontario, Canada), or any mobile phones equipped with the ANDROID platform (available from Google Inc., Mountain View, Calif.); tablets, such as the IPAD and KINDLE FIRE; and personal digital assistants (PDAs). The bi-directional communication and data transfer can take place via, for example, one or more of cellular telecommunication, a Wi-Fi LAN, a point-to-point Bluetooth connection, and/or an NFC communication. An "event" is a gathering of "participants" led by one or more "instructors" in which the instructors desire to use handheld devices to measure participants' attitudes, opinions, knowledge, or understanding about the relevant subject matter. The most common case consists of students attending a class led by a professor or graduate student who wants to gauge student understanding of the content (thus, "event" and "class" are utilized synonymously herein unless otherwise indicated). However, participants need not be in the same room as each other or the instructor, so events encompass distance learning situations. In addition, participants need not be students; they might be employees participating in a corporate training event, or workshop participants attending a workshop where the session leader wishes to gauge the opinions of the participants. Accordingly, the terms "participant" and "student" are used interchangeably herein, it being understood that the utility of the invention is not limited to students in classroom environments.

Accordingly, in one aspect, the invention pertains to a method of pretesting items for subsequent presentation to participants in a group. In various embodiments, the method may include the steps of storing, in a database, records specifying a participant and values for a plurality of predictor variables; analyzing the database to identify a cohort of records associated with participants who (i) are not in the group and (ii) have predictor-variable values similar to predictor-variable values associated with participants in the group; and pretesting the items with one or more participants in the cohort.

The analysis may include or consist of one or more matching algorithms, for example, parametric matching algorithms, nonparametric matching algorithms, semi-parametric matching algorithms, and/or various combinations of nonparametric matching algorithms and parametric matching algorithms (e.g., nonparametric matching followed by parametric matching). In one embodiment, the matching algorithm is a nonparametric matching algorithm such as coarsened exact matching algorithm. In some embodiments, the predictor variables include demographic characteristics, characteristics of instructors of classes in which the participant is enrolled, attributes of one or more classes in which the participant is enrolled, attributes of the institution the participant attends, behavioral characteristics, and/or performance attributes. The participants may each have a handheld device.

In various embodiments, the items are pedagogical questions and the pretesting step comprises (i) transmitting the items to at least some of the identified participants, (ii) obtaining answers from at least some said identified participants, and (iii) assessing success of the item based on the answers. Additionally, the guidance on how to revise the items may be based at least in part on the distribution of the responses or the answers eliciting from students and/or the impression of the item indicated from students' responses. For example, the instructor may focus on (i) the number of students who get the right answer; and (ii) the number of seemingly nonsensical responses associated with the misunderstanding or misinterpreting of the question itself, to decide whether to revise or to discard the item. In some embodiments, the analysis provides guidance on how to best revise the item to obtain more useful results in class.

In a second aspect, the invention relates to a system for of pretesting items for subsequent presentation to participants in a group. In various embodiments, the system includes an interface for receiving data identifying participants in the group. Each record stored in the database may specify a participant and values of one or more predictor variables. In various embodiments, the system includes a processor with an analysis module and a pretesting module. The analysis module may be configured to analyze the database to identify a cohort of records associated with participants who (i) are not in the group and (ii) have predictor-variable values similar to predictor-variable values associated with participants in the group. Additionally, the pretesting module may be configured to (i) cause the items to be provided to at least some of the participants whose records were identified and (ii) compile responses received from the participants in response to the items. The participants may each have a handheld device.

The system may include a communication module for responding to the pretesting module for (i) transmitting the items to the identified participants and (ii) receiving responses from the participants. In one embodiment, the communication module is configured for wireless Internet communication. In another embodiment, the communication module is configured for cellular telephone communication. Additionally, the communication module may be configured to communicate with remote databases maintained by different educational institutions, the processor being further configured to query the remote databases via the communication module and to include in the cohort records in the remote databases having predictor-variable values similar to predictor-variable values associated with participants in the group. In one embodiment, the analysis module is configured to utilize a matching algorithm (e.g., a nonparametric matching algorithm and/or a parametric matching algorithm) to identify the cohort.

The system may include a question database and the pretesting module may be configured to cause the communication module to wirelessly transmit the question to handheld devices of at least some of the identified participants. If the question has an associated answer time, the pretesting module may determine if an answer is received from a handheld device before the answer time has elapsed, and if so, cause the communication module to transmit to the handheld device at least one of the items as a request. The pretesting module may be further configured to aggregate response data from participants who responded to the request.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DESCRIPTION

Figure 1:
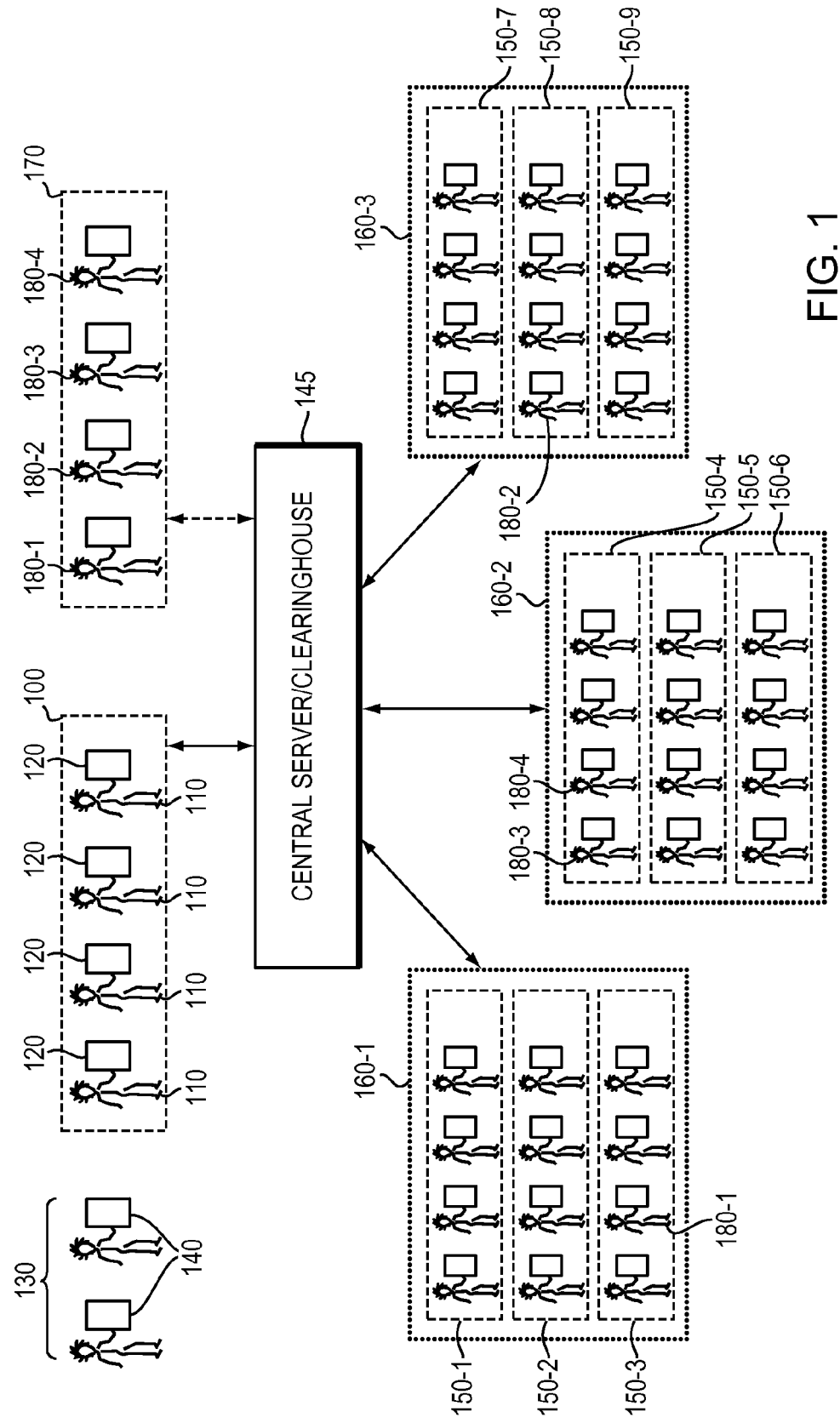
FIG. 1 schematically illustrates the creation of a composite class representative, for pretesting purposes, of the target class in accordance with various embodiments of the present invention.

FIG. 1 depicts an exemplary class 100 of participants or students 110 that may each have a handheld device 120 utilized to respond to one or more items posed by one or more instructors or organizers 130, who also may each have a handheld device 140. The nature of the information presented to the class is not material to the invention, nor are the specific roles of instructor and participant; instructor(s) 130 may, for example, be chosen from the participants 110 or may be a different group of people.

The participants 110 and the instructor(s) 130 may directly communicate via a communications link among the handheld devices 120, 140, or may instead communicate indirectly via a central sever or clearinghouse 145. The handheld devices 120, 140 may be, for example, computers, cell phones, smart phones, tablets, or other electronic devices that transmit participants' responses, attitudes, opinions, knowledge, characteristics, and/or understanding of relevant subject matter or items to one another, to the instructor(s) 130 and/or to the central sever 145 via a network. The transmitted subject matter may be in response to a question or a discussion topic that the instructor(s) 130 pose(s) to participants 110. In one representative implementation, the participants 110 are students and the instructor 130 is a professor or teacher who wishes to assess student understanding of pedagogic content. The students 110 in class 100 may be co-located (in, e.g., the same room or building) or geographically dispersed (e.g., participating in distance learning classes). In another embodiment, the activity is a corporate training event attended by employees or a workshop attended by workshop participants where the session leader wishes to gauge the opinions or responses of the participants. A person of ordinary skill in the art will appreciate that the invention described herein may be applicable to any group of participants pursuing pedagogical, intellectual, or business endeavors.

In accordance with embodiments of the invention, an algorithm is adapted to the problem of identifying a composite class for pre-testing purposes. Composite classes may be selected via analysis with the use of one or more matching algorithms (e.g., nonparametric matching algorithms and/or parametric matching algorithms) as described in the ensuing discussion.

The clearinghouse 145 is in communication with one or more other classrooms in one or more institutions (e.g., educational institutions such as schools or universities). For example, as shown in FIG. 1, the clearinghouse 145 communicates with classes 150-1, 150-2, and 150-3 at an institution 160-1, classes 150-4, 150-5, and 150-6 at an institution 160-2, and classes 150-7, 150-8, and 150-9 at an institution 160-3. The class 100 (or "target class") may be a class at any of institutions 160-1, 160-2, 160-3, or may be a class at a different institution. Although FIG. 1 depicts the class 100 and the classes 150 as each containing the same number of students, each class may consist of a different number of students. Also, one or more classes 150 may have the same instructor, who may even be the instructor 130 of the class 100. Alternatively, each of the classes 150 may have a different instructor.

As explained in more detail below, the clearinghouse 145 stores data related to each institution, class, and each student in each of the classes and utilizes such data to identify a potential set (or "cohort") of students in classes other than the target class from which a "composite class" may be created. A subset of the students thus identified forms a composite class that may be utilized to pretest items for the target class 100. For example, FIG. 1 depicts a composite class 170 composed of students 180-1, 180-2, 180-3, and 180-4 drawn from different classes and/or different institutions. The students 180 in the composite class 170 may be utilized to pretest items for the instructors 130 prior to (or instead of, if such pretesting is unsuccessful) utilizing the items to test the students 110 in the target class 100.

Figure 2:
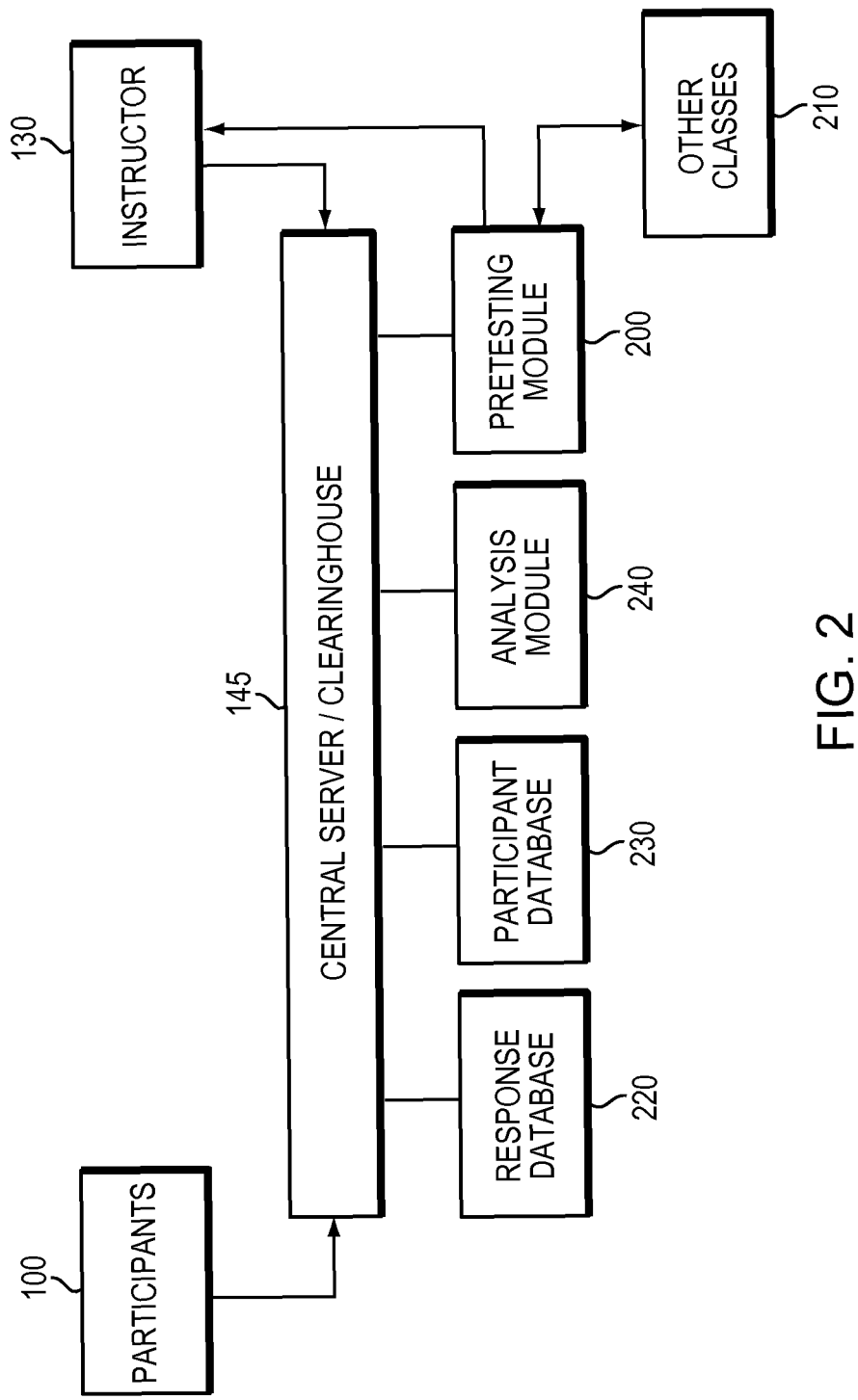
FIG. 2 is a block diagram illustrating deployment of a representative system in accordance with various embodiments of the present invention.

FIG. 2 depicts the utilization of pretesting information prior to or during conduction of an event (e.g., an instructional unit) for the target class. Prior to the event, the instructor 130 may wirelessly or otherwise (e.g., by means of a wired connection) transmit his or her items to be pretested to the central server 145 (that serves as the clearinghouse). In order to pretest the items, the central server 145, via a pretesting module 200, transmits the items to other classes 210 over a network and receives responses to the items provided by the participants in the other classes 210. The pretesting may occur over time; for example, certain other classes 210 may cover material relevant to the pretested items at different times. However, preferably all pretesting is completed before the pretested items are scheduled to be utilized in the target class 100 as testing items.

The responses to the pretested item are stored in a response database 220, and the data records associated with each of the participants in the other classes 210 (examples of such data are provided below) utilized to pretest the items are stored in a participant database 230. The databases 220, 230 may be part of the central server 145 (e.g., logical partitions within a hard drive) or may be deployed on separate devices accessible to the server 145 via a network. Data records associated with the participants 110 in the target class 100 are also stored in the participant database to facilitate creation of composite classes that match the target class; in addition, the participants 110 in the target class 100 may be utilized to pretest items for other classes and/or instructors utilizing the server 145.

As shown in FIG. 2, once the items have been pretested and information associated with such pretesting has been provided to the instructor 130 via the pretesting module 200, the instructor 130 may wirelessly or otherwise (e.g., by means of a wired connection) transmit the pretested items to the participants of the class 100 directly or via the central server 145, which communicates the items to the participants 110 via a network. The participants 110 then may wirelessly or otherwise (e.g., by a wired connection) transmit their responses to the items to the central server 145 via a network. Alternatively, the instructor 130 may utilize a different server (other than server 145) and/or network for transmission of the pretested items to the class 100.

The central server 145 also includes an analysis module 240 that utilizes, e.g., one or more matching algorithms (e.g., nonparametric matching algorithms and/or parametric matching algorithms) to create the composite class 170 corresponding to the target class 100. First, the analysis module identifies a potential set of students (or "cohort") from which the composite class may be assembled. The cohort may be chosen by maximizing the similarity to the target class, where "similarity" may be defined based on the "inputs" described below. The cohort may include any students/participants available for pretesting. Possible sources of composite classmembers include other sections of the same class taught by the same or instructors in the same institution, the same or a similar class at a different educational institutions, or students having fulfilled the prerequisite(s) to the target class. For the cohort, as many of these sources as are available may be used.

The analysis module 240 then creates the composite class utilizing all or (typically) only some of the participants in the cohort. For example, the initial cohort may be determined by eliminating (or ignoring) from the database classes (and students thereof) that are unrelated to (i.e., cover different subject matter than) the target class. From the cohort of remaining potential composite classmembers, a matching algorithm (e.g., a nonparametric matching algorithm and/or a parametric matching algorithm) may be used to prune students from the cohort who are unlike any of those in the target class. The matching algorithm may include students from any of the sources noted above. To facilitate matching, determination of a cohort from all participants from all classes in the database, and creation of the composite class, embodiments of the invention first identify matching variables, i.e., variables predictive of similar performance. Values for these variables are stored for the individuals in the participant database. Matching variables may involve characteristics such as:

1. Demographic characteristics of the participants and/or the instructor (e.g., age, sex, family income, educational background, origin, ethnicity, etc.). For college-based activities, a participant database record may specify demographic characteristics of the college (e.g., the ranking, specialties, catchment area for student population, etc.), as well as the geographic location of the college, facilitating identification of cohort members who attend a college demographically and/or geographically similar to the college where the target class takes place.

2. Behavioral characteristics (e.g., the reaction time to conceptual questions, the number of completed homework assignments, the percentage of positive feedback from other participants, etc.), facilitating identification of cohort members who have behavioral characteristics similar to those of individuals participating in the target class.

3. Performance characteristics (e.g., scores on previous exams, items, homework assignments, peer instruction, and past performance on and contribution to in-class peer instruction or conversations (e.g., whether they learn something and improve on the basis of peer instruction, or with which type of partner do they learn the most)), facilitating identification of cohort members who have performance characteristics similar to those of individuals participating in the target class.

One or more matching algorithms are then used to prune students from the (ideally large) potential set of students (i.e., the cohort) until the remaining composite class is as similar as possible to the target class. The composite class need not contain an identical number of students as the target class, but preferably contains a large enough number of students such that the distribution of the characteristics (e.g., any or all of the ones listed above) is representative of the members of the target class. In this manner the pretesting data from the composite class may be utilized to predict or determine the quality of the pretested items before such items are utilized to test the target class.

The matching algorithm utilized in accordance with embodiments of the invention may be a statistical matching method designed for unrelated purposes (including estimating causal inferences, record linkage in unconnected data bases, and/or missing data imputation). Any of various methods may be utilized. One suitable technique is Coarsened Exact Matching (see, e.g., Iacus, King & Porro, "Causal Inference Without Balance Checking: Coarsened Exact Matching"; and Stefano, King & Porro, "Multivariate Matching Methods That are Monotonic Imbalance Bounding," the disclosures of which are hereby incorporated by reference), which may be used to remove from the cohort participants who are unlike any of the participants in the target class (i.e., whose characteristics are significantly different from the target-class participants). As detailed in the abovementioned references, Coarsened Exact Matching (CEM) coarsens each variable by recoding so that substantively indistinguishable values are grouped and assigned the same numerical value. The groups may be the same size or different sizes depending on the defined predictor variables. An "exact matching" algorithm may be applied to the coarsened data to determine the matches and to prune unmatched units. After matching, the coarsened data may be discarded while the original uncoarsened values of the matched data are retained. This method is advantageous because it is very easy to use and understand; mathematical results proven about this algorithm indicate that it can more easily achieve known high levels of balance between the target class and the composite class; and because the level of balance, and the importance of each variable, may be chosen ex ante. Other nonparametric matching algorithms may be utilized instead of or in addition to CEM, and such algorithms include, e.g., Mahalanobis distance matching, full matching, and/or caliper matching.

Several other methods of matching can also be applied to this problem from the causal inference literature. Many of these are detailed in Ho, Imai, King, & Stuart, "Matching as Nonparametric Preprocessing for Reducing Model Dependence in Parametric Causal Inference," *Political Analysis* 15 (2007): 199-236 (the entire disclosure of which is hereby incorporated by reference), but others in the same literature may be applied as well. For example, parametric matching algorithms such as machine learning algorithms and/or statistical modeling may be utilized. As detailed in the Ho, Imai, King, & Stuart reference mentioned above, a matching method may include or consist essentially of a nonparametric matching algorithm followed by parametric analysis.

Figure 3:
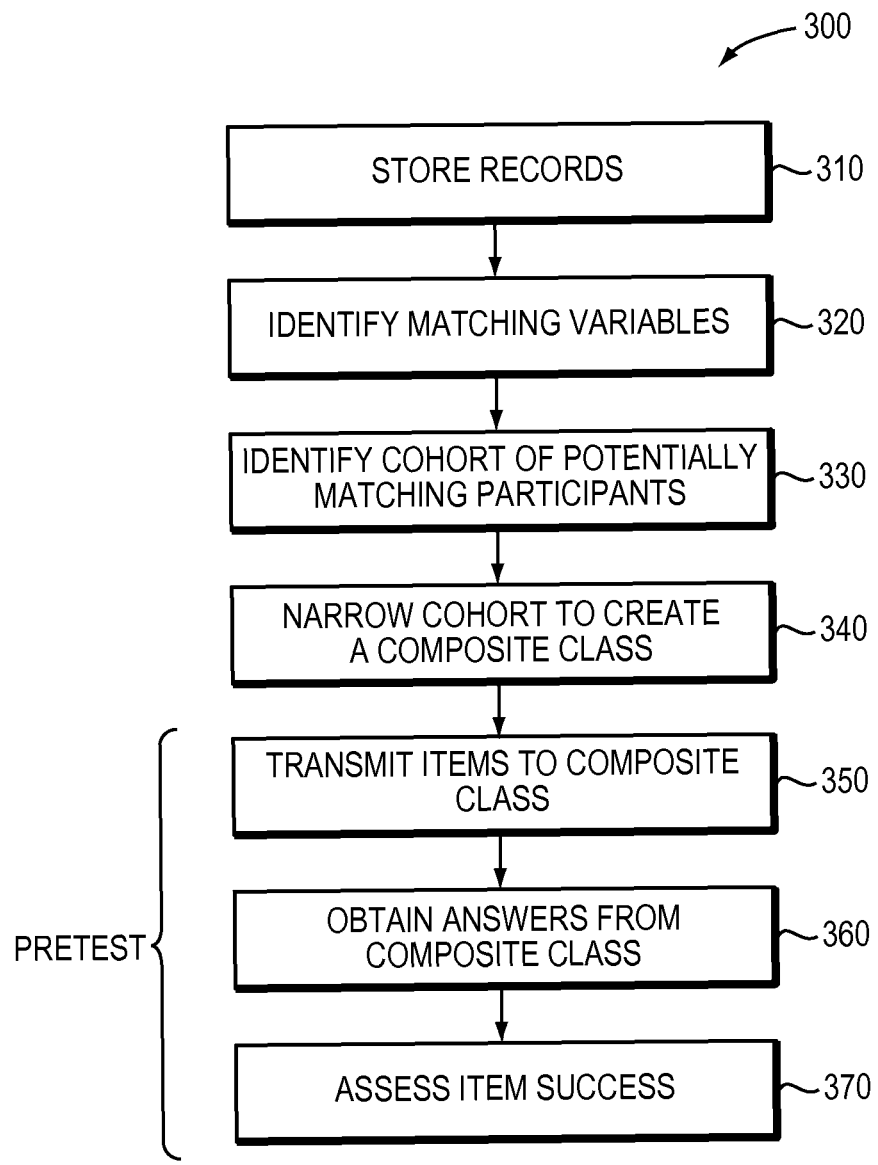
FIG. 3 depicts a method for pretesting analysis and feedback generation in accordance with various embodiments of the present invention.

A representative method 300 for pretesting items for subsequent presentation to participants in a group in accordance with embodiments of the current invention is shown in FIG. 3. In a first step 310, records associated with participants in the target class are stored in a participant database. In various embodiments, a set of matching or predictor variables for the target class are identified, in a second step 320, via a processor in the central server or clearinghouse. In a third step 330, a potential set of students are identified as a cohort, and in a fourth step 340, the identified set is typically narrowed to create a composite class representative of the target class.

Thereafter, specific items may be pretested utilizing the identified composite class. In various embodiments of the invention, such pretesting includes (i) transmitting the items to at least some of the identified participants in the composite class (step 350), (ii) obtaining answers from at least some members of the composite class (step 360), and (iii) assessing success of the items based on the answers (step 370). For example, success of a pretested item may be assessed by determining the number or percentage of members of the composite class answered the item correctly and/or the number or percentage of received answers that indicate at least some understanding of the material covered by the item.

In some embodiments, pretested items and responses from at least some members of the composite class will already be resident in the clearinghouse (the items having been previously transmitted thereto), and success of the items may be assessed, and feedback provided to the instructor, quite rapidly. In other embodiments, items for pretesting will be new to the clearinghouse, or an insufficient number of responses will be available from members of the composite class, and the item will be posed to at least some of the members of the composite class during the relevant events in which those members are participants. In such cases, assessment of the success of the pretested items may take some time as the necessary data is collected. Aggregated participant responses received during pretesting and/or statistical analysis thereof may be automatically communicated to the instructors 130 via their handheld devices.

Embodiments of the invention may require an affirmative "opt in" message or signal to participate. Instructors who participate may pretest questions in the optimally chosen set of students in a composite class constructed for this purpose, and instructors in these other classes may be able to pretest their questions using the students in this instructor's class, when his or her students are useful for creating a composite class for that instructor.

The actual pretesting may come from the central clearinghouse in a double-blind fashion, so that students and instructors from different classes have no knowledge of each other. For example, this may occur operationally either via email or the Internet outside of class, or during down time for students who answer questions quickly on an item (in the manner described in copending application entitled MANAGEMENT OF OFF-TASK TIME IN A PARTICIPATORY ENVIRONMENT, filed on even date herewith and the entire disclosure of which is hereby incorporated by reference). After responding in the same way as a standard question, participants may be invited to share their impressions of the item (akin to a cognitive debriefing by an interviewer in survey research).

Systems in accordance with various embodiments of the present invention may allow instructors to share items with each other. Anonymized performance data (either pretest data or actual performance data collected from the participants in the target class) may follow the item, so other instructors viewing the item may evaluate whether the item is suitable for their use.

Figure 4:
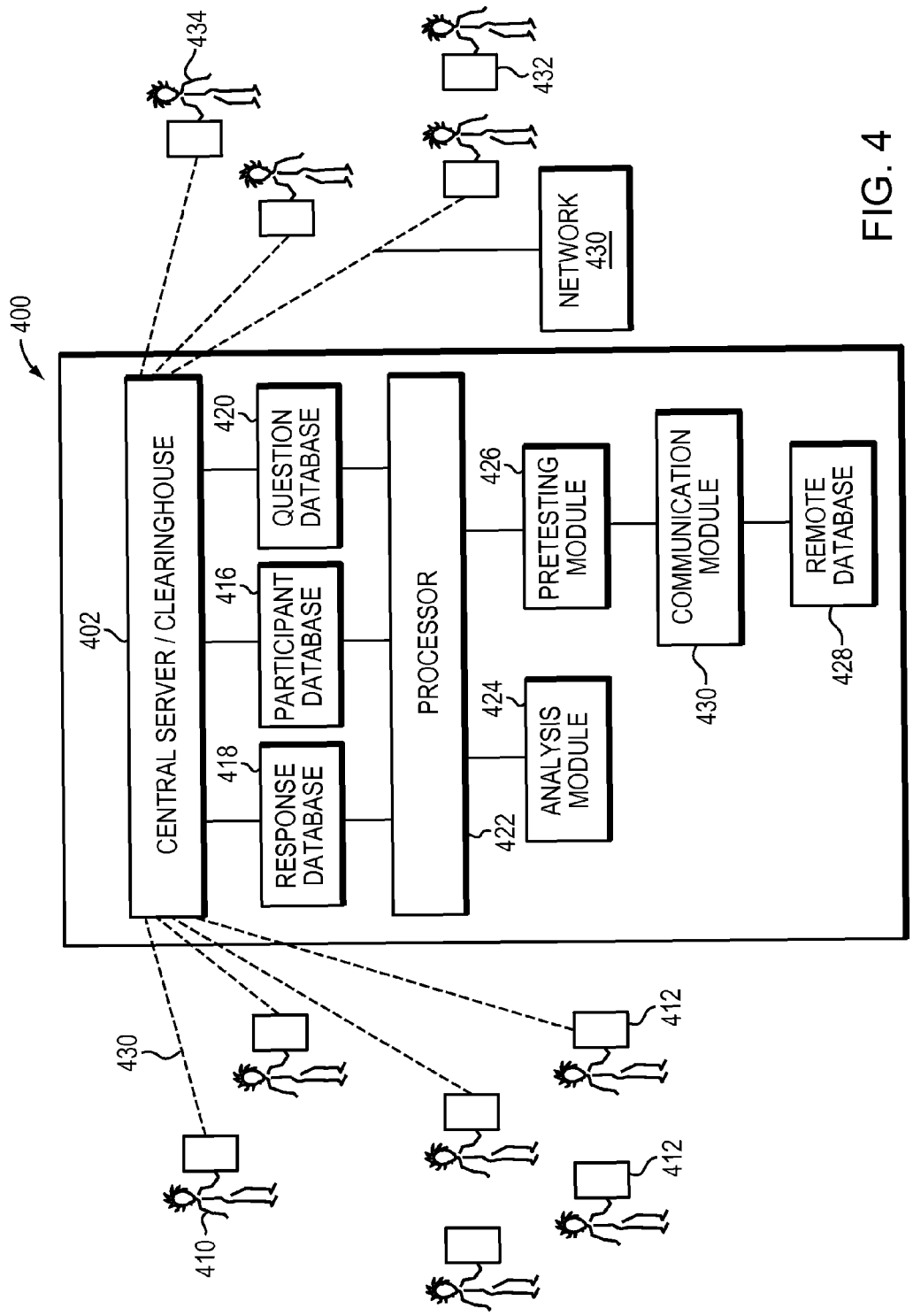
FIG. 4 illustrates a system for pretesting items for subsequent presentation to a group in accordance with various embodiments of the present invention.

An exemplary system 400 for pretesting items for subsequent presentation to participants in a target class in accordance with embodiments of the current invention is shown in FIG. 4; the system 400 may include a central server 402 that serves as the clearinghouse. The server 402 includes (or is in communication with) a response database storing the responses to the items and a participant database storing records each corresponding to a student in a participating class. Each record includes fields for data corresponding to the student-related matching variables described above, as well as the classes in which the participant is enrolled. The cohort of potential composite classmembers is drawn from records in the student database.

Participants 410 of the target class each may utilize a handheld device 412, and as noted above, the participants may be co-located or may be geographically dispersed. Similarly, a pool of participants 434 of other classes, from which the composite class is created, may each utilize a handheld device 432. Participants 410, 434 may connect to the server 402 over a wired or wireless network 430. The central server 402 includes (or is in communication with) a participant database 416, which contains records for the participants 410, 434. Each record identifies the participant, his or her handheld device 412, and participant-specific values for characteristics relevant to the item to be pretested. A response database 418 stores all the responses entered by the participants and a question database 420 stores the items entered by the instructors for testing or pretesting purposes. A processor 422 contains modules for implementing embodiments of the invention, including an analysis module 424 for identifying a cohort of records associated with participants who (i) are not in the target class and (ii) have predictor-variable values similar to predictor-variable values associated with participants in the target class. The processor 422 may also include a pretesting module 426 for (i) causing the items for pretesting to be provided to one or more participants in the identified composite class and (ii) compiling responses received from the participants in response to the items. Typically, communication with the handheld devices 412 occurs wirelessly, e.g., by SMS, an automated telephone call, e-mail or other suitable form of communication. Student-related variables may include, for example, one or more of (1) demographic characteristics of the students (such as age, sex, family income, educational background, origin, ethnicity, etc.), characteristics of the instructor of at least one class in which the student is enrolled (such as age, sex, education, origin, expertise, teaching experience of the instructor); (2) behavioral characteristics of the students (such as the time it take them to answer items, how many homework assignments they have completed, whether other students judge them to have been helpful, etc.); and (3) performance attributes of the students (such as scores on previous exams, items, homework assignments, peer instruction, and past performance on and contribution to in-class peer instruction or conversations (e.g., whether they learn something and improve on the basis of peer instruction, or with which type of partner do they learn the most)).

The analysis module 424 may first assemble the composite class based on analysis of the potential set (or cohort) against characteristics of the target class, which may be provided to the server 402 by the participating instructor via, for example, a handheld device or other computational entity. The analysis module 424 may employ a matching algorithm (e.g., a nonparametric matching algorithm and/or a parametric matching algorithm) to prune records from the potential set who are unlike any of those in the current class, using the matching variables, as described above.

Items to be pretested may be stored in question database 420. Each item record in the database 420 may also have associated class-related or institutional attributes, which are considered during the matching analysis. Class-related attributes specify characteristics of the target class for which pretesting is undertaken, i.e., the type of class where the item will be posed. Again, class attributes may specify size, composition based on the demographic characteristics of all the students, what experience they have, etc.; the subject, speed, and level at which the class is taught; and the ranking and teaching quality of the instructor. Institutional attributes, similarly, specify characteristics of the institution where the item will be posed and may specify its ranking among other institutions, its specialties, its catchment area for its student population and geographic location, the standing of the department, the standing and resources of the university, and the socioeconomic status of the institution.

The items are then provided to the composite class—ideally in a manner that integrates with instruction in the various classes in which students in the composite class are enrolled. For example, as noted above, questions may be presented to composite-class students (i.e., composite classmembers) in the form of a post-task question given in one of the student's classes. The results are aggregated and presented to the instructor pretesting the item.

The analysis module 424 may be implemented by computer-executable instructions, such as program modules, that are executed by a conventional computer. Generally, program modules include routines, programs, objects, components, data structures, etc. that performs particular tasks or implement particular abstract data types. Those skilled in the art will appreciate that the invention may be practiced with various computer system configurations, including multiprocessor systems, microprocessor-based or programmable consumer electronics, minicomputers, mainframe computers, and the like. The invention may also be practiced in distributed computing environments where tasks are performed by remote processing devices linked to the server 402 through communications module/network 430. In a distributed computing environment, program modules may be located in both local and remote computer-storage media including memory storage devices. Based on the analysis, the central server 402 may communicate the pretesting items to the handheld devices of the instructors requesting the pretesting. Typically, communication with the handheld devices occurs wirelessly, e.g., by SMS, an automated telephone call, e-mail or other suitable form of communication.

The server 402 may be configured to communicate with remote databases 428 maintained by different institutions (e.g., educational institutions) through communications module/network 430. The server 402 may query the remote databases 428 to include within databases 416, 418, 420 data from the different institutions relevant to the items to be pretested and to the target class.

Thus, server 402 may include a general-purpose computing device in the form of a computer including a processing unit 422, a system memory, and a system bus that couples various system components including the system memory to the processing unit. During operation, the system memory contains the instructions implementing the analysis module 424 and the pretesting module 426. Computers typically include a variety of computer-readable media that can form part of the system memory and be read by the processing unit 422. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by the processing unit 422. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

Any suitable programming language may be used to implement without undue experimentation the analytical functions described above. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the system and method of the invention. Rather, any number of different programming languages may be utilized as is necessary or desirable.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit 422 that executes commands and instructions may be a general-purpose processor, but may utilize any of a wide variety of other technologies including special-purpose hardware, a microcomputer, mini-computer, mainframe computer, programmed micro-processor, microcontroller, peripheral integrated circuit element, a CSIC (customer specific integrated circuit), ASIC (application specific integrated circuit), a logic circuit, a digital signal processor, a programmable logic device such as an FPGA (field programmable gate array), PLD (programmable logic device), PLA (programmable logic array), RFID processor, smart chip, or any other device or arrangement of devices that is capable of implementing the steps of the processes of the invention.

The network 430 maybe a wired or wireless local area network (LAN) and a wide area network (WAN), wireless personal area network (PAN) and/or other types of networks. When used in a LAN networking environment, computers may be connected to the LAN through a network interface or adapter. When used in a LAN networking environment, the central computing device 402 is connected to the LAN through a network interface or adapter. When used in a WAN networking environment, the central computing device 402 may include a modem or other network interface, e.g., a standard telecommunications platform for cellular communication. Mobile devices 412, 432 may be connected over the Internet, an Intranet, Extranet, Ethernet, the wireless telecommunications infrastructure, or any other system that provides communications. Some suitable communications protocols may include TCP/IP, UDP, or OSI, for example. Furthermore, components of the system may communicate through a combination of wired or wireless paths.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A server for pretesting items for subsequent presentation to participants in a target class, the system comprising:
   a processor; and
   a computer readable medium comprising instructions to perform the operations comprising:

transmitting, by the server, an item to devices associated with a potential set of students, wherein the item is presented by the devices associated with the potential set of students;

receiving first student input data from at least some of the devices associated with the potential set of students, wherein the first student input data is received in response to presenting the item to the potential set of students;

receiving at least one value of a characteristic associated with students in the potential set of students, wherein the characteristics corresponds with a demographic characteristic, a behavioral characteristic, or a performance characteristic of the students;

pruning, by the server, at least one of the first student input data received in response to presenting the item from the potential set of students to form a composite class of remaining students, wherein the composite class of remaining students comprises the first student input data and the composite class of remaining students is associated with a value matching the at least one value of the characteristic;

transmitting a post task question to at least some of the devices associated with the composite class of remaining students;

receiving second student input data in response to the post task question;

creating guidance on revising the item based at least in part on the first student input data or second student input data received from the devices associated with the composite class of remaining students; and transmitting, by the server, the guidance for revising the item to an instructor device associated with the target class.

2. The server of claim 1, wherein success of the item is assessed by determining a number or percentage of members of the composite class of remaining students answered the item correctly.

3. The server of claim 1, wherein success of the item is assessed by a number or percentage of received input that indicates at least some understanding of material covered by the item.

4. The server of claim 1, the operations further comprising:
determining, by the server, that the characteristics associated with the composite class of remaining students correspond with the characteristics of the target class.

5. The server of claim 1, wherein the revised item is automatically transmitted to the instructor device associated with the target class.

6. The server of claim 1, wherein the pruning implements a nonparametric matching algorithm.

7. The server of claim 1, wherein the pruning implements a coarsened exact matching algorithm.

8. A method for pretesting items for subsequent presentation to participants in a target class, the method comprising:
transmitting, by a computer system, an item to devices associated with a potential set of students, wherein the item is presented by the devices associated with the potential set of students;
receiving first student input data from at least some of the devices associated with the potential set of students, wherein the first student input data is received in response to presenting the item to the potential set of students;
receiving at least one value of a characteristic associated with students in the potential set of students, wherein the characteristics corresponds with a demographic characteristic, a behavioral characteristic, or a performance characteristic of the students;
pruning, by the computer system, at least one of the first student input data received in response to presenting the item from the potential set of students to form a composite class of remaining students, wherein the composite class of remaining students comprises the first student input data and the composite class of remaining students is associated with a value matching the at least one value of the characteristic;
transmitting a post task question to at least some of the devices associated with the composite class of remaining students;
receiving second student input data in response to the post task question;
creating guidance on revising the item based at least in part on the first student input data or second student input data received from the devices associated with the composite class of remaining students; and
transmitting, by the computer system, the guidance for revising the item to an instructor device associated with the target class.

9. The method of claim 8, wherein success of the item is assessed by determining a number or percentage of members of the composite class of remaining students answered the item correctly.

10. The method of claim 8, wherein success of the item is assessed by a number or percentage of received input that indicates at least some understanding of material covered by the item.

11. The method of claim 8, further comprising:
determining, by the server, that the characteristics associated with the composite class of remaining students correspond with the characteristics of the target class.

12. The method of claim 8, wherein the revised item is automatically transmitted to the instructor device associated with the target class.

13. The method of claim 8, wherein the pruning implements a nonparametric matching algorithm.

14. The method of claim 8, wherein the pruning implements a coarsened exact matching algorithm.

15. A non-transitory computer readable medium storing a plurality of instructions that when executed control a computer system to pretest items for subsequent presentation to participants in a target class, the instructions comprising:
transmitting, by a computer system, an item to devices associated with a potential set of students, wherein the item is presented by the devices associated with the potential set of students;
receiving first student input data from at least some of the devices associated with the potential set of students, wherein the first student input data is received in response to presenting the item to the potential set of students;
receiving at least one value of a characteristic associated with students in the potential set of students, wherein the characteristics corresponds with a demographic characteristic, a behavioral characteristic, or a performance characteristic of the students;
pruning, by the computer system, at least one of the first student input data received in response to presenting the item from the potential set of students to form a composite class of remaining students, wherein the composite class of remaining students comprises the first student input data and the composite class of remaining students is associated with a value matching the at least one value of the characteristic;

transmitting a post task question to at least some of the devices associated with the composite class of remaining students;

receiving second student input data in response to the post task question;

creating guidance on revising the item based at least in part on the first student input data or second student input data received from the devices associated with the composite class of remaining students; and transmitting, by the computer system, the guidance for revising the item to an instructor device associated with the target class.

16. The computer readable medium of claim 15, wherein success of the item is assessed by determining a number or percentage of members of the composite class of remaining students answered the item correctly.

17. The computer readable medium of claim 15, wherein success of the item is assessed by a number or percentage of received input that indicates at least some understanding of material covered by the item.

18. The computer readable medium of claim 15, the instructions further comprising:

determining, by the server, that the characteristics associated with the composite class of remaining students correspond with the characteristics of the target class.

19. The computer readable medium of claim 15, wherein the revised item is automatically transmitted to the instructor device associated with the target class.

20. The computer readable medium of claim 15, wherein the pruning implements a nonparametric matching algorithm.

* * * * *